United States Patent [19]

Williams

[11] 4,321,741
[45] Mar. 30, 1982

[54] METHOD FOR PROTECTING THE FEED TUBE OF A FOOD PROCESSOR

[75] Inventor: James E. Williams, Stamford, Conn.

[73] Assignee: Wilson Research & Development, Inc., Greenwich, Conn.

[21] Appl. No.: 120,692

[22] Filed: Feb. 11, 1980

Related U.S. Application Data

[62] Division of Ser. No. 17,822, Mar. 5, 1979, Pat. No. 4,226,373.

[51] Int. Cl.³ .............................................. B23P 19/00
[52] U.S. Cl. ...................................................... 29/434
[58] Field of Search ........................... 29/434, 455 R; 241/37.5, 281.1, 281.2, 92

[56] References Cited

U.S. PATENT DOCUMENTS

| | | | |
|---|---|---|---|
| 2,951,684 | 9/1960 | Labbe | 29/455 R X |
| 3,124,244 | 3/1964 | Hopgood | 29/434 UX |
| 3,892,365 | 7/1975 | Verdun | 241/281.1 X |
| 4,081,144 | 3/1978 | Bouillet | 241/37.5 |
| 4,117,980 | 10/1978 | Hartmann | 241/37.5 |

Primary Examiner—Charlie T. Moon
Attorney, Agent, or Firm—Parmelee, Johnson, Bollinger & Bramblett

[57] ABSTRACT

A method for protecting the feed tube of a food processor is described in which an outer sleeve associated with a movable food pusher and carrying an actuator enables operation of the food processor only when this outer sleeve is properly positioned over the feed tube. When the cover is properly positioned on the bowl and the outer sleeve is mounted over the feed tube with the food pusher being positioned and manually movable within the passageway in the feed tube, the actuator means carried by the sleeve is operatively associated in enabling relationship with control means in the housing to permit operation of the motor drive for the food processor. Thus, inadvertent insertion of a hand or a foreign object through the feed tube into the bowl is prevented when the rotatable tool is being driven by the motor drive. By virtue of this arrangement, the feed tube can safely be shortened, if desired, and made to have a larger cross-sectional area than in UL-approved food processors which are commercially available today in the United States for home use so that larger food items can be inserted whole through the feed tube into the food processor as well as allowing the placing of elongated food items horizontally in the feed tube so that they can be sliced longitudinally. Moreover, utilizing the feed tube protector in accordance with the present invention permits the entire size of the working bowl, cover and feed tube to be proportionally enlarged for providing a larger overall machine without compromising the safety features now provided by the relatively tall and narrow feed tube in prior art machines.

2 Claims, 6 Drawing Figures

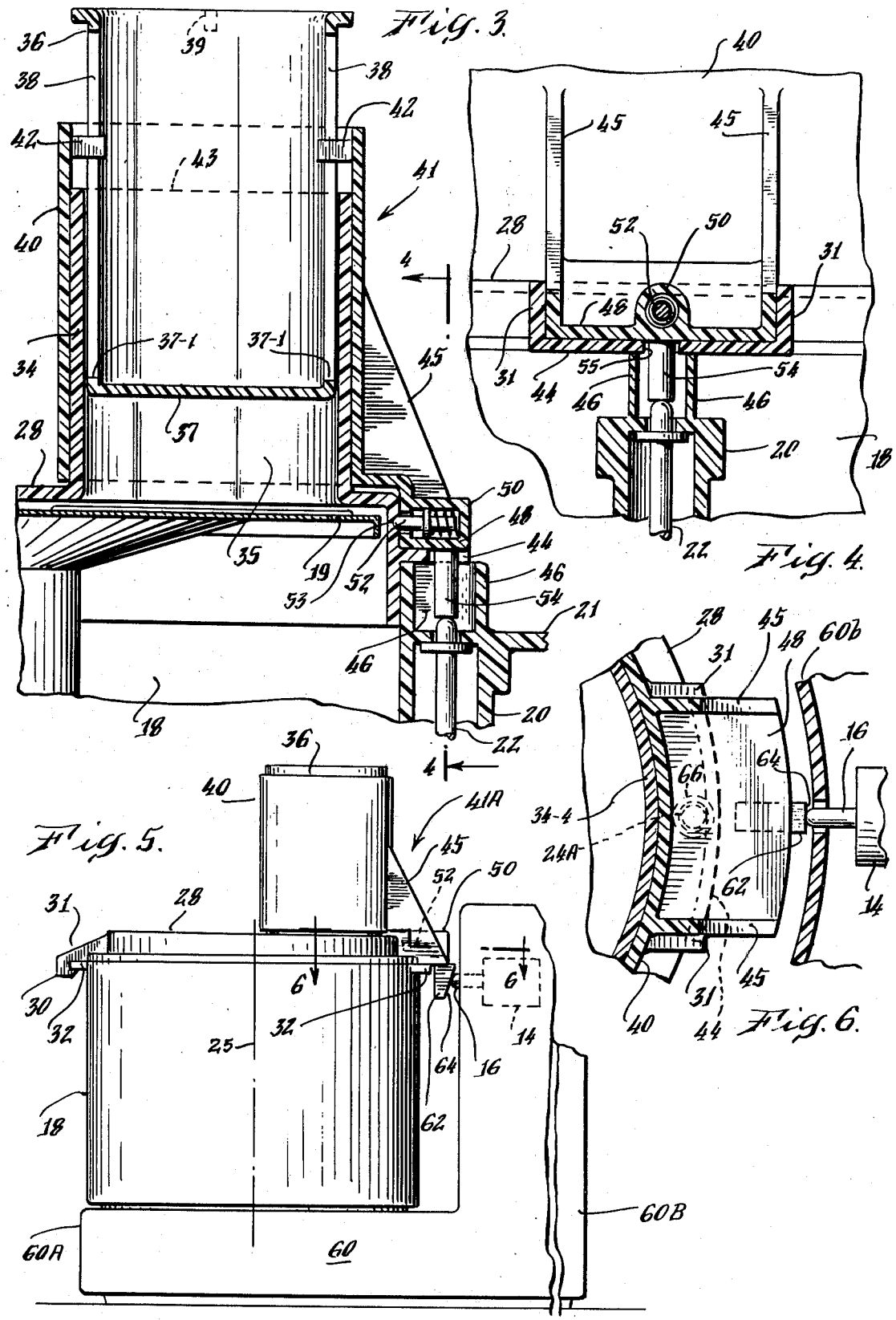

METHOD FOR PROTECTING THE FEED TUBE OF A FOOD PROCESSOR

RELATED APPLICATIONS

The present application is a division of prior copending application, Ser. No. 017,822, filed Mar. 5, 1979, and issued as U.S. Pat. No. 4,226,373 on Oct. 7, 1980.

FIELD OF THE INVENTION

This invention relates generally to food processors and more particularly to a feed tube protector for such machines which must be properly inserted on and manually operated by the user of the food processor in order to enable operation of the food processor for protecting both the user and the food processor from the injury.

BACKGROUND OF THE INVENTION

Food processors of the type to which the present invention is appliable have a working bowl with a motor-driven shaft projecting upwards in the bowl on which various selected rotary food processing tools can be engaged to be driven by the shaft for performing various food processing operations in accordance with the desires of the user. A detachable cover is secured over the top of the bowl during use. The cover includes a feed tube having a mouth that opens downwardly through the cover into the top of the bowl. The food items to be processed are placed in this feed tube and are then manually pushed down through the feed tube into the bowl by means of a removable food pusher which is adapted to slide down in the manner of a plunger through the feed tube. Further information with respect to such food processors may be obtained by reference to U.S. Pat. Nos. 3,892,365—Verdun, 3,985,304—Sontheimer and 4,127,342—Marcel Coggiola.

The rotary tools used in food processors are driven by relatively powerful motor drive arrangements and have the capability of causing injury to a finger or hand if the user could inadvertently bring a hand into contact with the motor-driven tool. For this reason, a bowl cover safety feature is conventionally incorporated into these units. This feature requires that the cover be firmly locked onto the bowl in normal operating position before the motor will start. This requirement is achieved by making the cover, which locks rotationally to the bowl, with a projection or member which causes the closing of a switch carried by a housing only when the cover is properly locked in its normal operating position on the bowl. Depending upon the type of food processor the aforesaid projection may actuate the switch directly or through an intermediate linkage. Thus, the motor cannot be energized before the cover is properly positioned on the bowl. However, this requirement that the cover be locked in place would not prevent injury if a hand were inserted down through the feed tube. Accordingly, the feed tube in accordance with another safety feature is deliberately designed in terms of shape, cross-section and height, i.e. it is relatively tall and narrow, to make it impossible for an adult inadvertently to insert a hand sufficiently far down into the feed tube to touch a rotating tool located in the upper portion of the working bowl. In addition, a food pusher is provided insertable into the feed tube for feeding food items down into engagement with the food processing tool.

The above limitations imposed on the size and shape of the feed tube for safety considerations limits the size and shape of food items which can be inserted and food processing operations which can be performed on such food items. For example, lengthwise slicing of carrots, cucumbers, celery, etc. could of necessity be severely limited to the crosswise dimension of the narrow prior art feed tube.

SUMMARY

It is an object of the present invention to provide a new and improved food processor having a feed tube protector which prevents operation of the food processor by the user unless the cover is locked in place on the properly installed working bowl and unless a feed tube protector is properly positioned over the feed tube for protecting the user as well as the machine against injury.

A further object of this invention is to provide a new and improved food processor with a safety actuation means which must be manually operated by the user in an appropriately safe manner to enable operation of the food processor, thereby preventing inadvertent injury either to the user or the food processor.

Still another object of this invention is to provide a new and improved food processor with suitable safety features which do not restrict the size, shape and overall dimensions of a food processor for home or restaurant use and which enable relatively large food feed passageways to be used with safety.

It is among the many advantages of a food processor embodying this invention that a feed tube protector is employed including an outer sleeve which nests over the feed tube and carries an actuator for enabling motor operation only when this outer sleeve is properly positioned over the feed tube, and this outer sleeve is associated with a movable food pusher mounted for plunger action within the passageway of a feed tube over which the outer sleeve has been nested.

In carrying out this invention in one illustrative embodiment thereof, a food processor of the type including a motor power source within a housing is provided with a power-on switch in the housing. A working bowl is mountable on the housing with a motor-driven shaft in the bowl which is adapted to have a rotatable food processing tool removably installed thereon. A removable cover is provided for the bowl which must be properly positioned on the bowl in order to actuate the power-on switch. A feed tube is mounted on and extends through the cover forming a passageway for feeding food items through the passageway of the feed tube into the bowl. The invention comprises a feed tube protector having an outer sleeve carrying a manually operable actuator thereon and with a movable food pusher mounted for movement within the interior of this outer sleeve. The outer sleeve is mountable over the feed tube with the food pusher being aligned with and manually movable as a plunger within the passageway in the feed tube. When the cover is properly positioned on the bowl and the feed tube protector is properly positioned on the feed tube, then the manually operable actuator means on the sleeve becomes operably associated in enabling relationship with the control means in the housing to permit operation of the motor drive for the food processor, thereby preventing the insertion of a hand or a foreign object into the feed tube when the rotatable tool is being driven by the motor drive.

With the outer sleeve in place on the feed tube, the food pusher carried for manual movement with respect to the sleeve may be used to feed food items which are to be processed toward the rotary tool. Accordingly, the food processor cannot be operated without first properly positioning the feed tube protector fully nested over the feed tube. Since the food pusher becomes directly aligned with the feed tube before the motor drive can be energized, it is not possible inadvertently to insert a hand or a foreign object through the feed tube into the food processor when it is being operated. A detent may be provided to continue operation of the food processor once it has been manually enabled to be energized by the initial depression of the outer sleeve into its fully nested position over the feed tube.

Among the advantages provided by the aforesaid feed tube protector are those resulting from the fact that the cross-sectional area of the food passageway and the feed tube can be made as large as may be desired so that larger food items can be inserted whole into the food processor. Furthermore, food items may be sliced or otherwise processed lengthwise along the larger dimension of the food item by horizontal positioning in the feed tube. As a result, the entire machine can be safely scaled up to larger sizes for home use, and commercial and industrial applications with corresponding enlargement of the cover, bowl and feed tube.

BRIEF DESCRIPTION OF THE DRAWINGS

Other objects, features and advantages of this invention will become more fully understood from a consideration of the following description in conjunction with the accompanying drawings in which like reference numbers are used to refer to corresponding elements throughout the various views:

FIG. 3 is an enlarged partial, cross-sectional view taken along line 3—3 of FIG. 2.

FIG. 4 is a cross-sectional view taken along line 4—4 of FIG. 3.

FIG. 5 is an elevational view similar to FIG. 1 illustrating the invention as embodied in a food processor having a different housing arrangement.

FIG. 6 is an enlarged partial sectional view taken along line 6—6 of FIG. 5.

DESCRIPTION OF THE PREFERRED EMBODIMENTS

Figure 2:
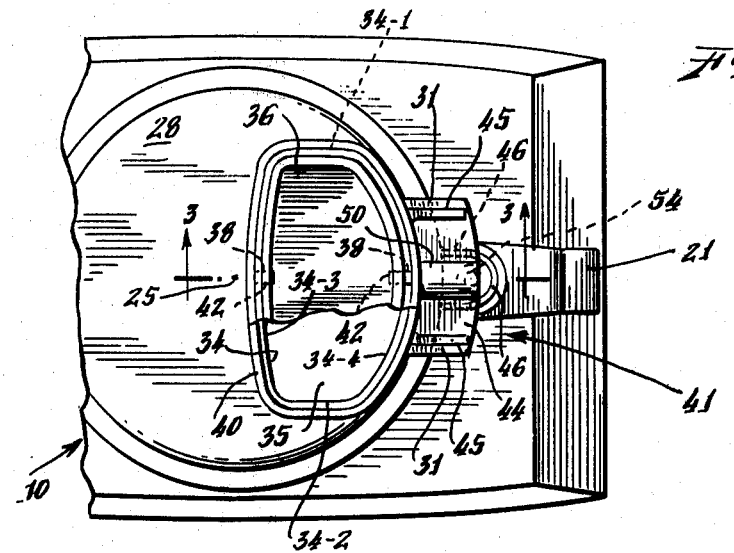
FIG. 2 is a partial top view of the food processor of FIG. 1, shown partly broken away to illustrate internal structure.
Figure 1:
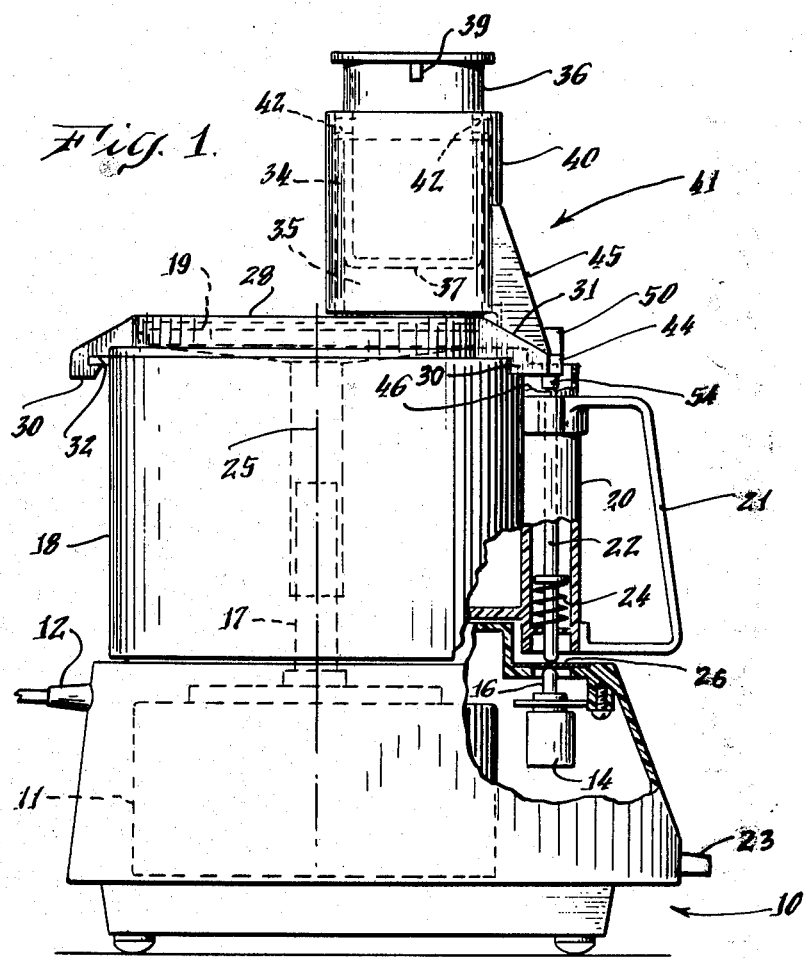
FIG. 1 is a side view of a food processor embodying the invention, a portion thereof being broken away to illustrate its internal construction.

Referring now to FIGS. 1 and 2 a food processor is illustrated having a base housing 10 containing a power source in the form of a relatively powerful electric motor 11 which is energized by power cord 12 via a switch 14 having a vertically movable actuating button 16. As is more fully shown and described in Verdun U.S. Pat. No. 3,892,365, a vertical drive shaft 17 extends upward from the base housing 10. A work bowl 18 is mountable on the housing 10 surrounding the drive shaft 17. A variety of different types of food processing tools, one of which is illustrated at 19, are provided which may be selectively mounted on the drive shaft 17 for rotation therewith within the bowl 18.

A vertical semi-cylindrical boss 20 formed on the side of the bowl 18 defines a guideway in which is carried a vertically movable operating rod 22 which is normally urged upwardly by means of a spring 24. When the bowl 18 is properly positioned on the housing 10, the operating rod 22 is aligned with the actuating button 16 of the switch 14, being separated therefrom by means of a flexible liquid-tight membrane 26. A handle 21 is attached to the boss 20 on the bowl 18.

The top of the bowl 18 is closed by a cover 28 which is arranged to be engaged in locked relationship in its normal operating position on the bowl 18 whenever the food processor is in operation. The cover may be held in locked engagement with the bowl by placing the cover on the rim of the bowl and turning the cover to obtain a twist-lock effect. One way of obtaining the locking engagement as illustrated in FIG. 1, is to provide the cover with a plurality of circumferentially located depending lugs 30, which upon rotation of the cover 28 engage beneath a plurality of cooperating radial ledges 32 on the bowl 18 near its rim. The cover 28 may be secured in place by any other suitable means, such as clamping means or other manually engageable latching means. It is to be understood that there are numerous ways and means in which such a cover 28 may be held in locked engagement upon the working bowl 18 during operation of the food processor.

Extending upwardly from the cover 28 is a feed tube 34 defining a passageway 35 therethrough which extends downwardly through the cover 28. As will be seen in FIG. 2, the feed tube 34 is widened in a direction concentric about the axis 25 of rotation of the rotary tool, thereby providing a generally rectangular passageway 35 as defined by two generally flat end walls 34-1 and 34-2 and a wide inner gently arced wall 34-3 with an arcuate peripheral wall 34-4 on the side of the feed tube farthest from the axis 25. This rectangular-arcuate shape of the passageway 35 is dramatically contrasted with the substantially tall, narrow oval shape illustrated in U.S. Pat. No. 3,892,365. As will be pointed out hereinafter the present invention enables the modification of the shape, size and height of the feed tube 34 without compromising the safety feature which such prior art tall, narrow feed tubes were intended to achieve. The feed tube 34 is designed to receive a food pusher which is manually insertable and employed to push food items down into engagement with the rotating tool 19. In use, the food items to be processed are manually placed into the feed tube passageway 35, and such a pusher is then inserted in the passageway so that food items are pushed down into contact with the rotating rool in the bowl 18.

The apparatus thus far described, except for the novel configuration of the feed tube, is conventional and illustrated in the aforesaid Verdun patent. Moreover, in such prior art food processors the cover 28 has included a caming surface which engages and forces down the operating rod 22 when the cover 28 is locked in its normal operating position on the bowl 18. The rod 22 in turn forces down the actuating button 16 of the switch 14 which thereby enables the motor 11 to be energized to cause the operation of the food processor. Actuation of the switch 14 may itself be arranged to produce operation of the motor drive. Alternatively, in some food processors the base housing may include one or more other on-off switches in series with the switch 14, with manually movable on-off or "jog" control levers, such as shown at 23 for turning on the electric power to the motor drive mechanism when all of the components of the machine are properly positioned for safe operation, as will be explained further below. This actuation of the electrical switch 14 by means of the correct positioning the cover 28 is intended as a safety feature inasmuch as the tool 19 can be driven by the motor drive only when the cover 28 is tightly in place.

It will be noted, however, that such a prior art food processor with a cam on the cover can therefore be operated even though the feed tube is open. A person could inadvertently insert a foreign object such as a fork or spoon down through the passageway 35 in the feed tube 34 to push food items down through the food passageway 35 and thereby cause injury or damage. In accordance with the present invention such possibilities are eliminated by omitting such a switch-actuating cam on the cover and by requiring that a telescoping outer sleeve carrying the food pusher be properly positioned in nested relationship over the feed tube and manually actuated before the food processor can operate.

This feed tube protector 41 is best illustrated in FIGS. 3 and 4, and these Figures show the cover 28 locked in proper position on the bowl 18. An outer sleeve 40 is provided which has the same general configuration as, and is slightly larger than, the feed tube 34 and is adapted to telescope over the exterior of the feed tube 34 in a close fitting but easily slidable relationship. Near the top of this outer sleeve 40 there are a plurality of guide means 42 in the form of inwardly projecting elements, for example such as tongues, lugs or splines, rigidly secured to the sleeve 40 and on which a food pusher 36 is slidably mounted in captivated relationship. The food pusher 36 has a plurality of longitudinally extending guideways 38 therein which are engaged in sliding relationship with the respective guide elements 42. These longitudinal guideways 38 may, for example, be in the form of molded channels, grooves or splineways extending along the outside surface of the food pusher 36, or these longitudinal guideways may, for example, be in the form of slots (as shown) in the sides of the pusher. Two opposed guide elements 42 and two corresponding longitudinal guideways 38 are shown, but more of each may be included if desired. The longitudinal guideways 38 extend down from near the top of the pusher 36 to the bottom 37. The food pusher may include stops 39 at its top which project out and which stop its downward travel when these stops hit the rim of the sleeve 40. The guide means 42 may serve as stops, if desired, to limit downward travel of the pusher.

By virtue of the fact that these guideways 38 are blocked at their lower ends, the food pusher 36 is permanently captured with respect to the outer sleeve 40 and cannot be completely extracted from the sleeve. The pusher 36 can be withdrawn from the sleeve 40 until the blocking regions 37-1 of the bottom abut against the guide means 42, at which point the bottom 37 of the pusher is above the top 43 of the feed tube. The outer sleeve 40 thus carries the food pusher 36 for slidable movement therein by the guide means 42 being engaged in the guideways 38, which permit the food pusher 36 to be moved vertically within the outer sleeve 40.

The exterior of the food pusher 36 also has the general configuration of the passageway 35 in the feed tube 34, being slightly smaller such that when the outer sleeve 40 is telescoped over the exterior of the feed tube 34, the food pusher becomes positioned in alignment with the feed passageway 35 for plunger action therein.

The outer sleeve 40 carries an annular flange 48 along one side thereof and shown as being at a lower elevation than the lower end of the outer sleeve and which is provided with additional support by upwardly extending stiffening ribs 45. This sleeve flange 48 carries a boss 50 therein which houses an inwardly-extending, spring-biased detent 52 adapted to engage in a recess 53 on the rim of the cover when the outer sleeve 40 has been fully nested down over the feed tube 34 for removably holding this sleeve in operative position. This detent 52 may be omitted if desired, in which case the sleeve 40 is held down manually in operative position. Extending downwardly and centrally from the underside of the sleeve flange 48 is an actuator 54 which is aligned with the push rod 22 only when the cover 28 is properly locked in position on the bowl 18 as shown in these views.

A complementary structure is provided on the cover 28 in the form of a flange 44 having stiffening ribs 31 and with a central vertical opening 55 therethrough which accommodates the insertion of the actuator 54 projecting down from the flange 48 of the outer sleeve 40. When the cover 28 is mounted on the bowl 18 with the depending lugs 30 therein locked in position under the radial ledges 32 of the cover, then and access opening 55 in the cover flange 44 is aligned with the operating rod 22 and will accommodate the engagement of the actuator 54 on the outer sleeve 40 down onto this operating rod for depressing this rod for closing the switch 14 for enabling the motor drive to be energized.

In order to prevent inadvertent actuation of the rod 20 the boss 20 has positioned thereon an upright guard socket 46 as seen in FIG. 4 including a curved upright front portion shown in FIGS. 1 and 2. This guard socket 46 thus prevents access to the upper end of the operating rod 22 around the sides of the rod 22, and thus require that the rod be actuated vertically from above.

In operation, the cover 28 is placed on the rim of the bowl 18 and locked in place, for example it is turned to cause the depending lugs 30 on the cover 28 to engage under the cooperating radial ledges 32 on the bowl 18 to obtain a twist-lock effect. In this locked operating position the opening 55 in the cover flange 44 is placed in alignment over the rod 22 which is guarded by the socket 46. Food items to be processed are then inserted into the feed tube 34. The outer sleeve 40 carrying the food pusher 36 is then telescoped over the exterior of the feed tube 34 with the food pusher 36 being positioned in alignment with the passageway 35 of the feed tube with the bottom of the pusher 37 being able to be manually moved down into contact with the food items to be processed. In its inactivated position the downwardly projecting actuator 54 on the sleeve flange 48 is positioned directly over the operating rod 22. In order to actuate the switch 14 the sleeve 40 or sleeve flange 48 is manually depressed causing the actuator 54 to depress the switch-operating rod 22. Depressing the operating rod 22 causes the actuating button 16 to be depressed thereby closing the switch 14 and enabling the motor drive to be operated, for example, by moving the control lever 23. Thus, the tool 19 starts rotating, the food pusher 36 is then manually depressed to force the food items in the feed tube passageway 35 into engagement with the rotating food processing tool in the bowl 18.

By providing the detent 52, as discussed above, the sleeve 40 is temporarily held down, thereby causing the actuator 54 to hold the operating rod 22 down in spite of the lifting force of the spring 24, thereby continuing the food processing operation until the sleeve 40 is removed or at least retracted vertically for enough in an upward direction to release the detent 52 and allow the spring 24 to lift the operating rod for opening the switch 14. For many applications, it may be preferable to push the sleeve 40 down and to hold it down manually against the lifting action of the spring 24 until the processing operation is complete, at which time releasing the sleeve 40 will immediately allow the spring 24 to open the switch 14 to stop the motor drive. Accordingly, the detent 52 is not essential, and it is illustrated as an added feature, if desired.

It should be observed that even when the cover is in its properly locked operating position on the bowl, the machine cannot inadvertently be activated. The sleeve and the food pusher must be mounted on the feed tube and the sleeve manually actuated before the food processor will operate. If no detent is provided, the sleeve must be held down with one hand while the food pusher is operated with the other hand which provides the operator with complete safe control over the operation of the food pusher at all times.

It should also be noted that not only is proper alignment provided by the opening 55 in the cover flange 44 but that additional alignment is provided by cooperation of the vertical ribs 31 on the cover with the vertical ribs 45 on the outer sleeve 40. When the sleeve 40 and its flange 48 are manually depressed downwardly, the ribs 45 nestle snuggly between the more widely spaced ribs 31 on the flange 44, thereby providing an additional assurance of the cover and sleeve being properly in place to permit the manual actuation by the sleeve 40 of the rod 22.

FIGS. 5 and 6 illustrate another form of feed tube protector 41A embodying the invention adapted for use with a food processor of the type which may have a motor located in an upright portion 60B of the housing standing upright adjacent to the working bowl 18 or may have a switch located in such an upright portion of the housing, with the motor in the base portion 60A. Such a food processor is characterized by a housing 60 illustrated in FIG. 5 which is L-shaped as seen in side-elevation. The upstanding portion 60B may contain the on-off switch 14 with its actuating button 16 extending into a position where it can be actuated by a properly positioned actuator attached to the manually operable outer sleeve 40.

When the motor is in the upright portion 60B, then the horizontal base portion 60A of the housing contains a mechanical drive connection extending from the motor to the drive shaft 17 as is known from food processors of this type which are currently commercially available. The drive shaft 17 extends up into the working bowl 18 for receiving a food processing tool similar to the arrangement shown in FIG. 1. The bowl 18 is substantially the same as described before. However, the cover of prior art food processors of this L-shaped housing type includes a fixed cam for engaging the horizontally mounted switch button 16 located in the upstanding housing portion or pedestal 60B so as to assure that the motor does not become energized until the cover is held in its normal position on the bowl.

Nevertheless, the same hazards exists in these prior art food processors of the L-shaped pedestal housing type (FIG. 5) as described before in connection with other types of food processors. That is, the feed passageway 35 may be open when the tool in the bowl is being driven by the motor. In accordance with the embodiment shown in FIG. 5 and FIG. 6 the feed tube protector 41A must be in place before the motor drive can be operated. A cam actuator 62 is mounted on the flange 48 of the outer sleeve 40 in lieu of the actuator 54 illustrated in FIG. 4. The cam actuator 62 has an outwardly-upwardly sloping cam surface 64 which is adapted to come in contact with the actuator button 16 of the switch 14 when the cover 28 is properly positioned on the bowl 18 and the outer sleeve 40 carrying the food pusher 36 is properly positioned on the feed tube and is manually depressed. When the outer sleeve 40 is pushed down in place, the cam surface 64 depresses the switch actuator button 16 to enable the motor drive to be operated. A compression spring 24A is mounted in a socket 66 on the flange 44 of the cover which exerts upward force on the flange 48 of the sleeve 40. Thus, the release of the outer sleeve allows the spring 24A to lift this sleeve sufficiently far that the cam actuator 62 is returned to its inactivated position with its cam surface 64 having released the actuator button 16 of the switch 14.

The feed tube protector embodying the present invention is not complex, is easy to operate and prevents the inadvertent operation of the food processor when the feed tube is open to expose the interior of the work bowl. The safety feature thus provided is synergistic in its advantageous complementary interaction with the present configuration of food processors in not requiring elaborate redesigns and modifications of the food processors to achieve and provide this desirable safety feature.

Since other modifications and changes varied to fit particular operating requirements and environments will be apparent to those skilled in the art, the invention is not considered limited to the examples chosen for purposes of illustration and includes all changes and modifications which do not depart from the true spirit and scope of this invention.

In the foregoing description, it is explained that actuation of the switch 14 enables the electric motor 11 to be energized for operating the motor drive. It is to be understood that the objective is to prevent power-driven operation of the food processing tool in the bowl until all of the components are properly positioned, as described. Therefore, in the following claims the phrase "electric motor drive" or "motor drive" or similar phraseology should be interpreted sufficiently broadly to include the modification that an electrically actuable clutch or mechanically actuatable clutch is included as a part of the motor drive, such a clutch being interposed between the electric motor 11 and the tool drive shaft 17. When such a clutch is present, the motor may be energized and rotating, but the food processing tool will not become driven by the motor until the clutch is energized or mechanically enabled to actuate the motor drive. For example, the button 16 can be connected to linkage which electrically or mechanically disables such a clutch, thereby rendering the clutch inactive or otherwise unable to transmit driving power from the motor to the tool drive shaft until the button 16 is depressed.

What is claimed is:

1. In a method of constructing a food processor of the type including a housing containing an electric motor drive and control means in said housing for rendering said motor drive inoperative unless said control means is actuated, a bowl mountable on said housing for enclosing a rotatable tool within said bowl driveable by a tool drive shaft when said motor drive is rendered operative by actuation of said control means, a removable cover adapted to be locked on said bowl, with a feed tube mounted on said cover forming a passageway for pushing food items toward the rotating tool, the novel safety method of constructing the food processor comprising the steps of:

providing an outer sleeve nestable in predetermined position around the exterior of said feed tube;

capturing said food pusher in telescoping relationship with respect to said outer sleeve for enabling said food pusher to be moved longitudinally within said outer sleeve;

positioning said captured food pusher in alignment with the interior of said outer sleeve for causing said food pusher to become aligned with said food passageway and to be plungeable into said food passageway only when said outer sleeve is nested around said feed tube; and allowing actuation of said control means in the food processor only when said outer sleeve is properly nested in said predetermined position around said feed tube;

thereby inherently causing said food pusher to be blocking access through said passageway into the bowl whenever the motor drive is actuated for rotating the food processing tool in the bowl.

2. The novel safety method of constructing the food processor as claimed in claim 1, in which:

actuation of said control means in the food processor is allowed only when said outer sleeve is nested down fully around said feed tube.

* * * * *